US008931137B2

(12) United States Patent  (10) Patent No.: US 8,931,137 B2
Daniel et al.  (45) Date of Patent: Jan. 13, 2015

(54) BUSHING FOR A FIREARM GRIP SCREW

(71) Applicant: Remington Arms Company, LLC, Madison, NC (US)

(72) Inventors: Buddie Daniel, Kennesaw, GA (US); Robert Michael Howard, Kennesaw, GA (US)

(73) Assignee: RA Brands, L.L.C., Madison, NC (US)

( * ) Notice: Subject to any disclaimer, the term of this patent is extended or adjusted under 35 U.S.C. 154(b) by 94 days.

(21) Appl. No.: 13/749,137

(22) Filed: Jan. 24, 2013

(65) Prior Publication Data

US 2013/0185895 A1 Jul. 25, 2013

Related U.S. Application Data

(60) Provisional application No. 61/589,887, filed on Jan. 24, 2012.

(51) Int. Cl.
*F41C 27/00* (2006.01)
*F16B 5/02* (2006.01)
*F41C 23/10* (2006.01)

(52) U.S. Cl.
CPC ............... *F41C 27/00* (2013.01); *F16B 5/0258* (2013.01); *F41C 23/10* (2013.01); *Y10S 411/902* (2013.01); *Y10S 411/903* (2013.01)
USPC .............................. 16/2.1; 411/902; 411/903

(58) Field of Classification Search
CPC ..................................................... F16B 5/0258
USPC ............... 16/2.1, 2.2, 2.3, 2.4, 2.5, 422, 426, 16/DIG. 24; 411/902, 903
See application file for complete search history.

(56) References Cited

U.S. PATENT DOCUMENTS

| 179,075 | A | | 6/1876 | Smith | |
|---|---|---|---|---|---|
| 632,457 | A | * | 9/1899 | Gardiner | ........................ 16/2.4 |
| 1,585,249 | A | | 5/1926 | Johns | |
| 1,748,006 | A | * | 2/1930 | Wohlart | ..................... 408/72 B |
| 2,292,351 | A | | 8/1942 | Carpenter et al. | |
| 2,386,205 | A | | 10/1945 | Garand | |
| 2,453,394 | A | | 11/1948 | Wittman | |

(Continued)

FOREIGN PATENT DOCUMENTS

GB              24995      2/1900
WO     WO2006/101410      9/2006

OTHER PUBLICATIONS

Harold A. Murtz editor; The Gun Digest Book of Exploded Long Gun Drawings; pp. 70, 89, 96, 112, 225; Krause Publications; Iola, Wisconsin; 1993.

*Primary Examiner* — Jeffrey O Brien
(74) *Attorney, Agent, or Firm* — Womble Carlyle Sandridge & Rice, LLP

(57) ABSTRACT

A bushing for securing a grip to a firearm that includes a housing made from a resilient material and an insert made from a material having a hardness greater than the resilient material of the housing. The housing has a top end, a bottom end, a housing bore extending from the top end to the bottom end, and a contact surface that is configured to engage an internal surface of a receiver of the firearm. The insert is sized and shaped to be received within the housing bore and includes an insert bore configured for engagement with a fastener. The housing is configured to undergo elastic deformation when compressed between the insert and the internal surface of the receiver as the fastener is tightened to draw the insert toward the internal surface of the receiver.

11 Claims, 5 Drawing Sheets

(56) References Cited

U.S. PATENT DOCUMENTS

| | | | |
|---|---|---|---|
| 2,455,438 | A | 12/1948 | Oppold |
| 2,455,644 | A | 12/1948 | Barnes |
| 2,610,426 | A | 9/1952 | Beretta |
| 2,771,697 | A | 11/1956 | Reising |
| 2,782,545 | A | 2/1957 | Schadeck |
| 2,826,848 | A | 3/1958 | Davies |
| 3,104,136 | A * | 9/1963 | Merriman ............... 384/296 |
| 3,164,920 | A | 1/1965 | Haas, Jr. et al. |
| 3,204,284 | A * | 9/1965 | Merriman ............... 16/2.1 |
| 3,380,183 | A | 4/1968 | Miller et al. |
| 3,683,535 | A | 8/1972 | Lewis |
| 3,895,408 | A * | 7/1975 | Leingang ............... 16/2.1 |
| 4,148,149 | A * | 4/1979 | Pachmayr et al. ....... 42/71.02 |
| 4,430,822 | A | 2/1984 | Fromming et al. |
| 4,542,606 | A | 9/1985 | Hoenig |
| 4,619,544 | A * | 10/1986 | Laidely ............... 16/2.1 |
| 4,656,689 | A * | 4/1987 | Dennis ............... 16/2.2 |
| 4,689,912 | A | 9/1987 | Gillum |
| 5,048,215 | A | 9/1991 | Davis |
| 5,069,586 | A * | 12/1991 | Casey ............... 16/2.1 |
| 5,426,882 | A | 6/1995 | Dornaus |
| 5,813,158 | A | 9/1998 | Campbell et al. |
| 5,946,842 | A | 9/1999 | Nyzell et al. |
| 6,294,734 | B1 * | 9/2001 | Daoud ............... 16/2.2 |
| 6,328,513 | B1 * | 12/2001 | Niwa et al. ............... 16/2.1 |
| 6,658,781 | B1 | 12/2003 | Bowen |
| 6,782,791 | B2 | 8/2004 | Moore |
| 6,925,744 | B2 | 8/2005 | Kincel |
| 7,191,557 | B2 | 3/2007 | Gablowski et al. |
| 7,273,002 | B1 | 9/2007 | Rogers |
| 7,322,141 | B1 | 1/2008 | Leung |
| 7,340,857 | B1 | 3/2008 | Bentley |
| 7,454,858 | B2 | 11/2008 | Griffin |
| 7,665,240 | B1 | 2/2010 | Bentley |
| 7,731,464 | B2 * | 6/2010 | Nagayama ............... 411/903 |
| 7,770,318 | B2 | 8/2010 | Bentley |
| 7,802,953 | B2 * | 9/2010 | Stephen ............... 411/903 |
| 7,866,078 | B1 | 1/2011 | Beretta |
| 8,127,658 | B1 | 3/2012 | Cottle |
| 8,176,835 | B1 | 5/2012 | Cottle |
| 8,205,371 | B1 | 6/2012 | Cook et al. |
| 8,215,047 | B2 | 7/2012 | Ash, Jr. et al. |
| 8,245,428 | B2 | 8/2012 | Griffin |
| 8,393,104 | B1 | 3/2013 | Moody et al. |
| 2003/0079311 | A1 * | 5/2003 | Yamamoto et al. ........ 16/2.1 |
| 2009/0313873 | A1 | 12/2009 | Roth |
| 2010/0031551 | A1 | 2/2010 | Griffin |
| 2010/0275484 | A1 | 11/2010 | Bentley |
| 2011/0113665 | A1 | 5/2011 | Cottle et al. |
| 2012/0055059 | A1 | 3/2012 | Cauhape |
| 2012/0266513 | A1 | 10/2012 | Gnesda et al. |

* cited by examiner

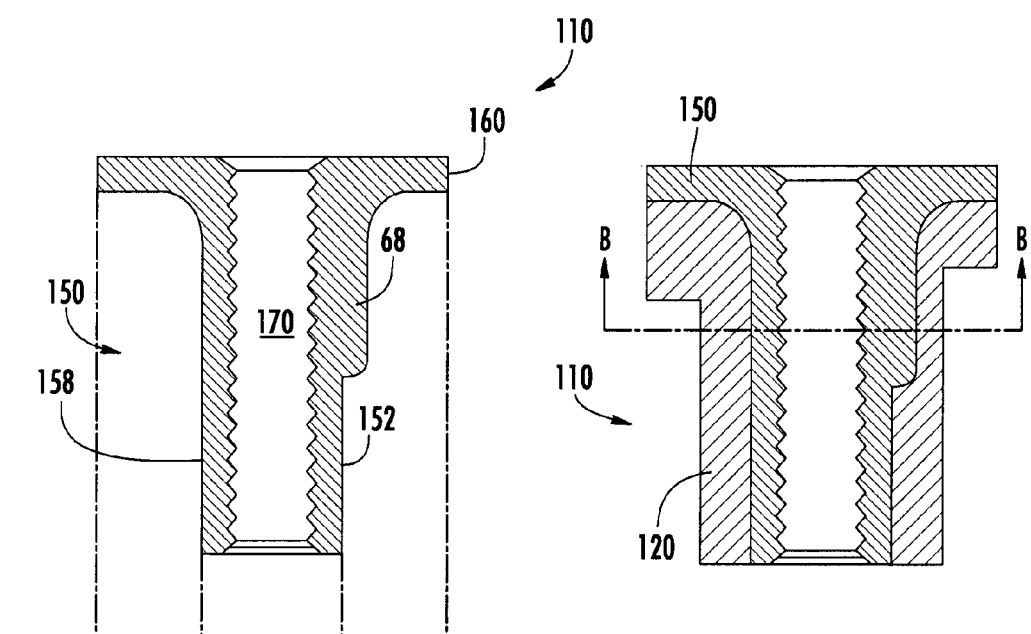
FIG. 5A
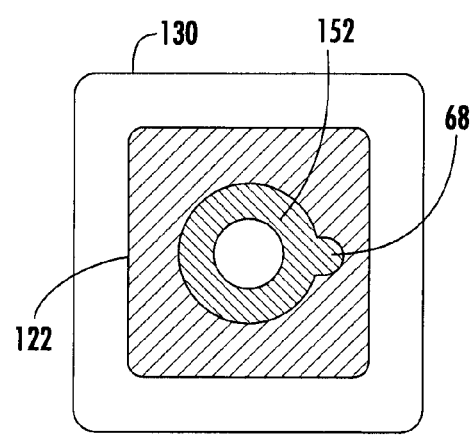
FIG. 5B
FIG. 5C

US 8,931,137 B2

BUSHING FOR A FIREARM GRIP SCREW

RELATED APPLICATIONS

The present patent application is a formalization of previously filed, co-pending U.S. Provisional Patent Application Ser. No. 61/589,887, filed Jan. 24, 2012 by the inventors named in the present application. This patent application claims the benefit of the filing date of the cited Provisional Patent Application according to the statutes and rules governing provisional patent applications, particularly 35 U.S.C. §119(a)(i) and 37 C.F.R. §1.78(a)(4) and (a)(5). The specification and drawings of the Provisional Patent Application referenced above are specifically incorporated herein by reference as if set forth in their entirety.

TECHNICAL FIELD

The present disclosure relates generally to firearms and, in particular, to grip screws and bushings for use with securing firearm handles the receiver portion of a firearm.

BACKGROUND

Grips or handles are secured to firearms in order to improve the usability of the firearm. These grips or handles are typically secured to a firearm receiver or stock with a grip screw. Typically, the threaded ends of these elongate screws are anchored to the firearm with a bushing that can be maintained within the firearm receiver or stock. Through repeated use of a firearm, the condition of a conventional bushing can deteriorate and impair the relationship between the bushing and the grip screw and thus the connection between the grip and its firearm.

Accordingly, there exists a need for an improved bushing for receiving the threaded end of an elongate grip screw extending through a firearm handle or grip to better maintain the connection between the grip and the firearm. It is to the provision of a solution to this and other problems that the present disclosure is primarily directed.

SUMMARY

Generally described herein, the present disclosure relates to an improved bushing for use with a firearm to retain a firearm grip or handle in place with respect to a firearm. For example, the bushing could be used to secure a grip or handle directly to the receiver of a firearm or to a portion of the firearm stock, such as along the handguard or adjacent a butt stock portion of the firearm stock. The bushing includes a housing and an insert. The insert further includes an internally-threaded insert bore configured to receive the threaded end of a grip screw, and can be constructed of a hard and durable metallic material which maintains its shape when the grip screw is tightened into the bushing to secure the firearm grip to the receiver or stock of the firearm. The housing includes a housing bore that is configured to receive and support the insert, and can be constructed of a resilient, semi-compliant material. Being made of a resilient material, the housing can become compressed between the insert and a surface of the firearm when the grip screw in tightened into place to create a preload force. In turn, the compression of the housing can provide a reactive force on the insert which maintains the tension on the grip screw, and hence the connection between the firearm grip and the receiver or stock of the firearm, even after repeated firings of the firearm. The bushing further can include an anti-rotation feature configured to prevent the insert from rotating within the housing bore when the threaded end of the grip screw is received within the insert bore.

The present disclosure also includes a bushing for installation within the receiver or a portion of the stock of a firearm to secure a firearm grip or handle to the firearm. The bushing comprises a housing formed from a resilient material and an insert formed from a having a hardness greater than the resilient material of the housing. The housing has an elongate base and a seat extending radially outwardly from a top end of the base, with the seat having an upper surface and a lower surface opposite the upper surface that is configured to engage an internal surface of the receiver or stock of the firearm. The housing also has a housing bore extending from the upper surface of the seat to the bottom end of the base.

The insert of the bushing is sized and shaped for insertion within the housing bore, and includes a retaining lip extending radially outward from a first end of the insert, and a bottom surface configured to engage the upper surface of the seat in a substantially flat-lying alignment. The insert also includes an insert bore extending along the insert and having an interior connection for engaging a fastener. In addition, the bushing can include an anti-rotation feature configured to prevent the insert from rotating within the housing bore when the fastener is received within the insert bore.

The present disclosure further provides a method for securing a firearm grip to a firearm that includes assembling a bushing having a housing formed from a resilient material and an insert formed from a hard, substantially rigid material. The housing comprises an elongate base having a housing bore extending therethrough, and a seat extending radially outwardly from one end of the elongate base. The insert comprises an elongate body having an insert bore with an internal connection configured to engage a fastener, and a retaining lip extending radially outwardly from one end of the body, and wherein the body of the insert is inserted into the housing bore until a bottom surface of the retaining lip contacts an upper surface of the seat.

The method also includes inserting the assembled bushing outwardly through an aperture in the firearm, such as along the receiver or a portion of the stock portion thereof, until a lower surface of the seat engages an internal surface of the receiver or stock, and positioning the firearm grip over the base of the housing. The method further includes inserting the screw through at least a portion of the firearm grip and into engagement with the insert bore, and tightening the fastener into engagement with the internal connection of the insert bore until the firearm grip is securely coupled to the firearm.

The specific techniques and structures employed to improve over the drawbacks of the prior devices and accomplish the advantages described herein will become apparent from the following detailed description of representative embodiments and the appended drawings and claims.

BRIEF DESCRIPTION OF THE DRAWINGS

FIG. 5A is an exploded cross-sectional side view of a bushing for use with a firearm grip screw, in accordance with another representative embodiment of the present disclosure.

FIG. 5B is an assembled cross-sectional side view of the bushing of FIG. 5A.

FIG. 5C is an assembled cross-sectional bottom view of the bushing of FIG. 5A, as viewed from section line B-B of FIG. 5B.

DETAILED DESCRIPTION OF REPRESENTATIVE EMBODIMENTS

It is to be understood that the invention of the present disclosure is not limited to the specific devices, methods, conditions, or parameters of the representative embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

Generally described, the present disclosure relates to a bushing configured to receive an elongate grip screw and serve as an anchor for securing a grip or handle of a firearm to the receiver or along a portion of the stock of the firearm. As used in the indicated application, the term "bushing" may also be described as a "T-Nut", which may be considered a term of art in the firearms industry. In use, the bushing of the present disclosure is generally retained within a hole or aperture defined in the firearm receiver or a portion of the stock of the firearm, such as along the handguard or adjacent a butt stock portion of the firearm, and generally includes a contact surface that bears against an inside surface of the receiver or stock portion of the firearm, with a portion of the bushing extending outside the receiver or stock of the firearm. The grip screw can extend through the firearm grip or handle to engage with a threaded bore formed into the bushing in order to secure the handle to the firearm receiver or stock.

Figure 1:
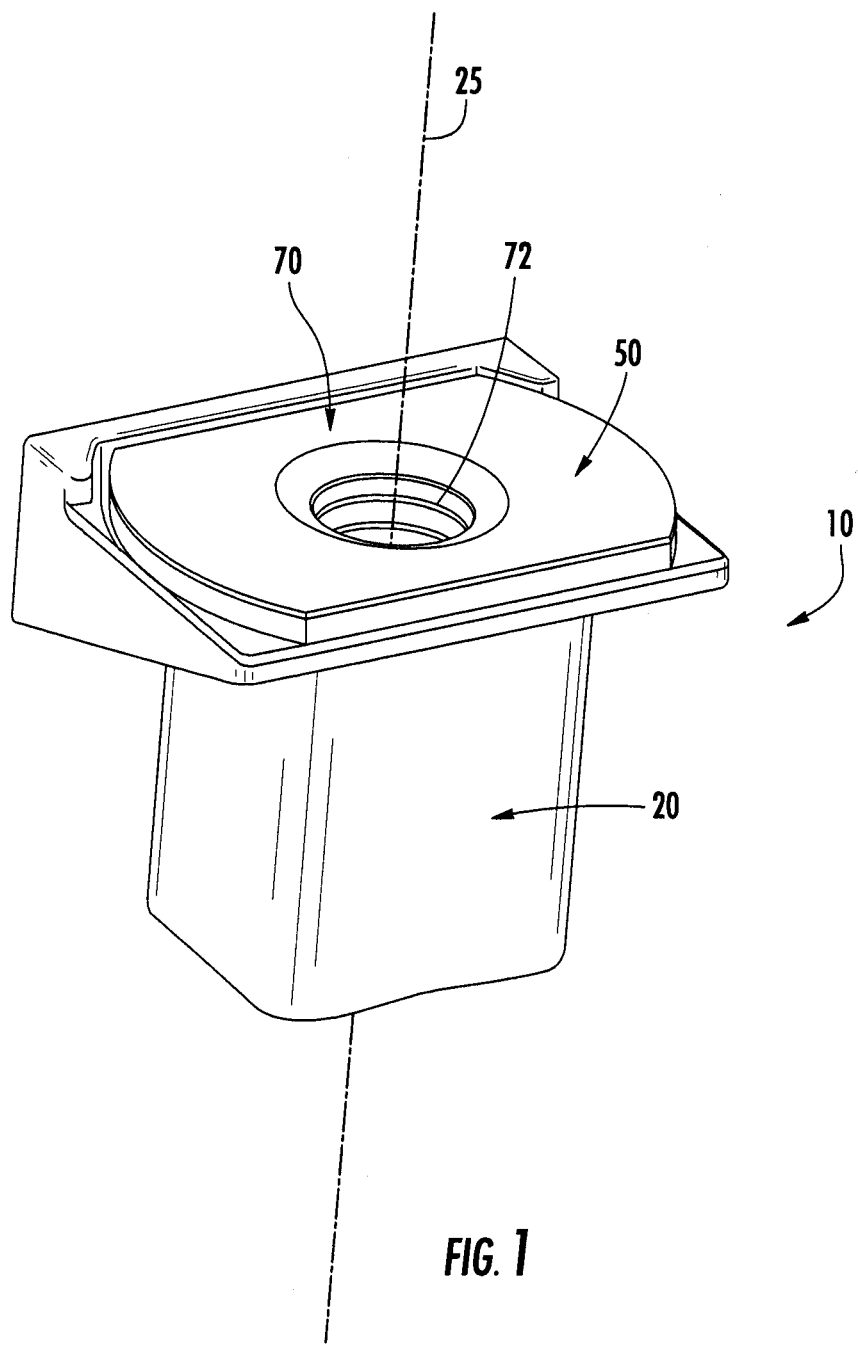
FIG. 1 is a perspective view of an assembled bushing for use with a firearm grip screw, in accordance with a representative embodiment of the present disclosure.

FIG. 1 is a perspective view of an assembled bushing 10 in accordance with a representative embodiment of the present disclosure. The bushing 10 includes a housing 20 and an insert 50 that may be removably received within the housing 20. The insert 50 has an insert bore 70 with an internal thread 72 that is configured to receive the threaded end of a grip screw. In addition, the insert 50 can be constructed of a highly-durable and hard metallic material which maintains its shape when the grip screw is tightened within the insert 50 to pull the bushing 10 into the firearm, such as into an aperture such as shown at 84 in FIG. 4, formed along the receiver or the stock of the firearm and secure the firearm grip to the firearm. The housing 20 includes a housing bore that is configured to receive and support the insert 50. In addition, the housing 20 can be constructed of a resilient, semi-compliant material that can undergo limited elastic deformation as it is compressed between the insert 50 and the surface firearm when the grip screw is tightened to create the preload force that pulls the assembled bushing 10 into the firearm. In response, the resilient compression of the housing 20 portion of the bushing 10 can provide a reaction force on the insert 50 which maintains the tension on the grip screw, and hence the connection between the firearm grip and the receiver or stock of the firearm, even after repeated firing of the firearm.

Figure 2:
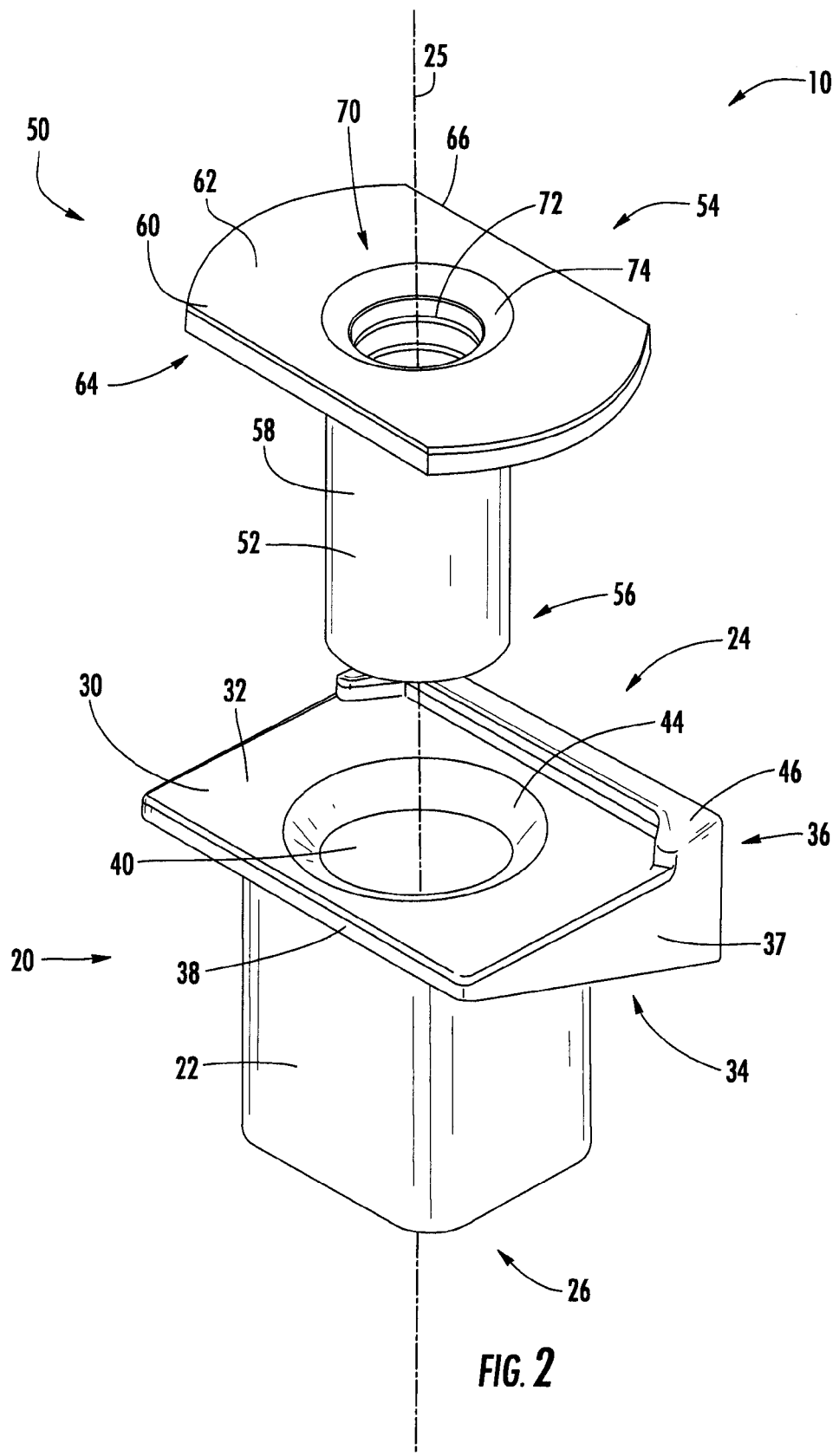
FIG. 2 is an exploded perspective view of the bushing of FIG. 1.

FIG. 2 is an exploded assembly view of the bushing 10 which provides better structural detail of the housing 20 and insert 50 of the representative embodiment. As can be seen, the housing 20 has a elongate base 22 having a top end 24, a bottom end 26, and a longitudinal axis 25 extending through the center of the elongate base 22 from the top end 24 to the bottom end 26. The housing 20 may also include a seat 30 extending radially outward, as referenced from the longitudinal axis 25, from the top end 24 of the base 22. The seat 30 can have an upper surface 32 and a lower surface 34 opposite the upper surface 32, with the lower surface 34 being configured to bear against an internal surface of the receiver or a portion of the stock of the firearm. The upper surface 32 of the seat 30 extends in a direction that is generally perpendicular to the axis 25 of the elongate base 22.

In one aspect, the seat 30 can have a thick end 36, a narrow end 38, and wedge-shaped side surfaces 37 extending between the thick end 36 and the narrow end 38 so that the lower surface 34 of the seat 30 is oriented at an oblique angle relative to the top surface 32 of the seat 30 and to the longitudinal axis 25 of the base 22. Once installed within the firearm receiver or stock, the housing 20 with a wedge-shaped seat 30 and an angled lower surface 34 positions the bushing 10 to extend through the aperture in the wall of the portion of the firearm to which it is to be mounted at an angle, so as to accommodate firearm grips that may be coupled to the firearm at an angle. In other aspects (not shown) the seat of the housing may have substantially the same thickness on all sides so that the elongate base extends straight out, or downwardly, through the aperture.

The housing 20 further includes a housing bore 40 extending along the axis 25 of the elongate base 22 from the upper surface 32 of the seat 30 to the bottom end 26 of the base 22. The housing bore 40 may include a tapered mouth with a curved chamfer surface 44 that provides a smooth transition between the upper surface 32 of the seat 30 and an internal surface of the housing bore 40.

As shown in FIG. 2, the insert 50 can have a shape that is similar to the general shape of the housing 20, including an elongate body 52 having a first end 54, a second end 56 opposite the first end 54, and an outer surface 58 that is sized and shaped for insertion within the housing bore 40 along the longitudinal axis 25 of the elongate base 22. The insert 50 further can further include a transverse retaining lip 60 extending radially outward from the first end 54 and having a bottom surface 64 that extends in a direction that is generally perpendicular to the axis 25 of the elongate body 52. The bottom surface is 64 of the retaining lip 60 can be configured to abut and mate flush with the upper surface 32 of the seat 30 when the insert 50 is assembled with the housing 20.

The insert 50 can further include an insert bore 70 opening from the second end 56 of the elongate body 52 to receive the threaded end of the grip screw, and which insert bore 70 can also extend along the axis 25 toward the first end 54 of the elongate body 52. The insert bore 70 can have an interior thread 72 that is configured to connect with the threaded end of the grip screw. In one aspect, the insert bore 70 can extend all the way through to an exit opening 74 at the first end 54 the elongate body 62.

The bushing 10 can include an anti-rotation feature which prevents the insert 50 from rotating within the housing bore 40 when the threaded end of the grip screw is received within the insert bore 70. The anti-rotation feature may be formed at the interface between the upper surface 32 of the seat 30 and the retaining lip 60 of the insert 50, or at the interface between the outer surface 58 of the elongate body 22 and the interior surface of the housing bore 40. In the embodiment of the bushing 10 illustrated in FIGS. 1-2, for example, the anti-rotation feature can comprise a raised edge 46 extending upward from the upper surface 32 of the seat 30 and proximate the thick end 36 of the seat 30. The inside surface of the raised edge 46 can align with a side edge 66 of the retaining lip 60 to prevent the insert 50 from rotating. As shown in more detail below, other structures which prevent the insert 50 from rotating within the housing bore 40 are also possible.

Figure 3A:
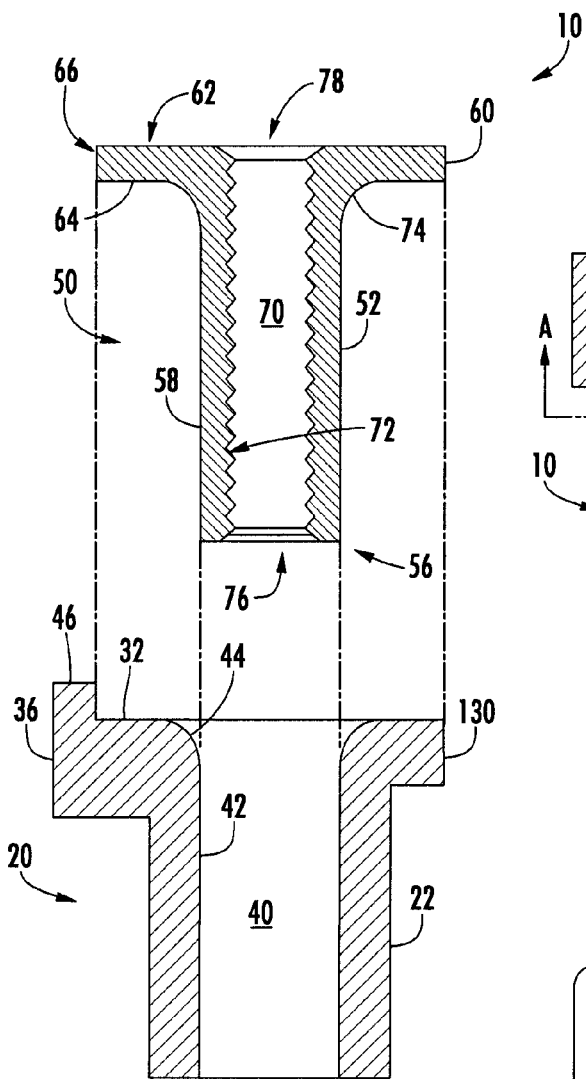
FIG. 3A is an exploded cross-sectional side view of the bushing of FIG. 1.
Figure 3B:
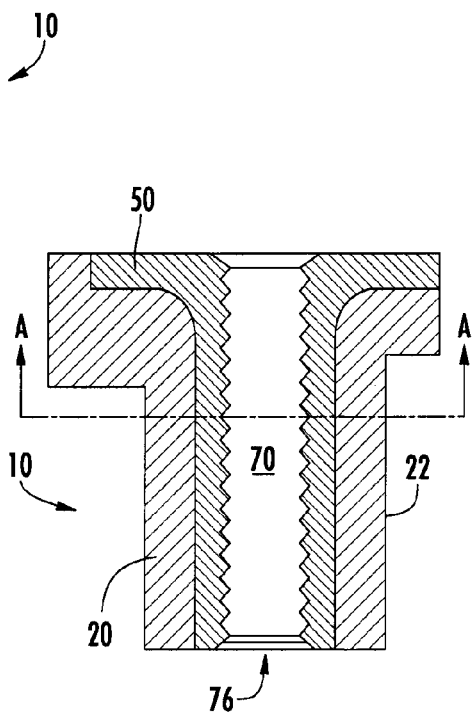
FIG. 3B is an assembled cross-sectional side view of the bushing of FIG. 1.
Figure 3C:
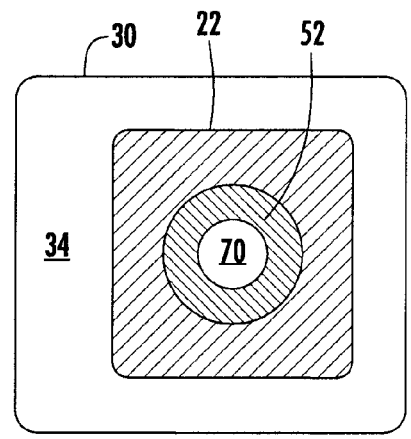
FIG. 3C is an assembled cross-sectional bottom view of the bushing of FIG. 1, as viewed from section line A-A of FIG. 3B.

FIGS. 3A-3C are cross-sectional drawings of the housing 20 and insert 50 of the bushing 10 described above. As can be seen, a fillet 74 with a tapered or curved surface can extend between the outer surface 58 of the elongate body 52 and the underside surface 64 of the retaining lip 60. The curved surface of the fillet 74 can nest within curved chamfer surface 44 formed into the tapered mouth of the housing bore 40.

The raised edge 46 is configured to abut against one of the retaining side edges 66 of the retaining lip 60. As discussed above, these retaining side edges 66 of the retaining lip 60 align with the inside surface of the raised edge 46 in order to prevent rotation of the insert 50 with respect to the housing 20 when the insert is inserted into the housing bore 40, as shown in FIG. 3B. The height of the raised edge 46 from the top surface 32 of the seat 30 can be substantially similar to the thickness of the retaining lip 60 so that a generally flush surface may be created across the upper surface of the raised edge 46 and the topside surface 62 of the retaining lip 60. In another aspect of the present disclosure (not shown), the raised edge may be configured to overhang the topside surface of the retaining lip to prevent the insert 50 from exiting the housing 20.

As illustrated in FIGS. 3A and 3B, the threaded insert bore 70 of the insert 50 may be a thru-hole that extends completely through the insert 50, from the entrance opening 76 at the lower or second end 56 of the elongate body 52 to an exit opening 78 in the topside surface 62 of the retaining lip 60. In another aspect of the present disclosure (not shown), the insert bore may extend up into the elongate body from the entrance opening a distance that is less than the length of the insert, to that the topside surface 62 of the retaining lip 60 is smooth and uninterrupted without the exit opening formed therein.

As further illustrated in the bottom, cross-sectional drawing of FIG. 3C, as viewed from section line A-A of FIG. 3B, both the elongate base 22 and the seat 30 of the housing 20 can have generally rectangular cross-sectional shapes with rounded corners. In addition, the aperture in the receiver of the firearm can have the same generally rectangular shape that is sized to snuggly receive the elongate base 22 when the assembled bushing 10 is installed into the firearm. As such, the flat side surfaces of the elongate base 22 and the rectangular footprint provided by the lower surface 34 of the seat 30 as it contacts the inside surface of the receiver or stock portion of the firearm can provide the bushing 10 with additional stability that resists tipping and cocking of the bushing 10 within the aperture, and which can better secure the grip to the firearm. In other aspects of the present disclosure, both the elongate base 22 and the seat 30 of the housing 20 can have different outer profiles or shapes, including but not limited to circular, triangular or elliptical shapes, etc. In addition, the complimentary, mating profiles or shapes of the inner surface 42 of the housing bore 40 and the outer surface 58 of the elongate body 52 of the insert 50 are illustrated as being generally circular, but they can also optionally have different profiles or shapes, including but not limited to circular, triangular or elliptical shapes, etc.

The insert 50 can be constructed of a highly-durable and hard material such as, for example, a metallic material such as steel. In contrast, the housing 20 can be constructed of a resilient, semi-compliant material having a hardness less than the hardness of the hard material forming the insert 50. For example, the resilient, semi-compliant material forming the housing 20 can be an injection-molded synthetic material such as nylon or glass-filled nylon. The resilient, semi-compliant material which forms the housing 20 can have sufficient stiffness and rigidity to maintain its shape under a heavy load, while still having of modulus of elasticity that is less than the modulus of elasticity of the hard material forming the insert 50. As a result, the semi-compliant material forming the housing 20 will more readily deflect or deform under a compressive load than the hard material forming the insert 50, and provide a degree of compliance which allows the assembled bushing 10 to more readily maintain a tensile force on the grip screw throughout repeated firings and use.

During assembly of the bushing 10, the body 52 is inserted into the housing bore 40 formed through the base 22. In one aspect, the diameter of the outer surface 58 of the body 52 can be slightly tapered and/or larger than the diameter of the housing bore 40, so that when the elongate body 52 is inserted or forced into the bore 40, a snug or press fit can be formed between the body 50 and the bore 40. In addition, the outer surface 58 of the body 52 and the inner surface 42 of the bore 40 can both be smooth to facilitate ingress and egress of the two with respect to each other so that one or both can be repaired or replaced during regular maintenance. As described above, the insert bore 70 formed through the center of the elongate body 52 has a threaded inner surface 72 for receiving a correspondingly threaded grip screw when in use.

Figure 4:
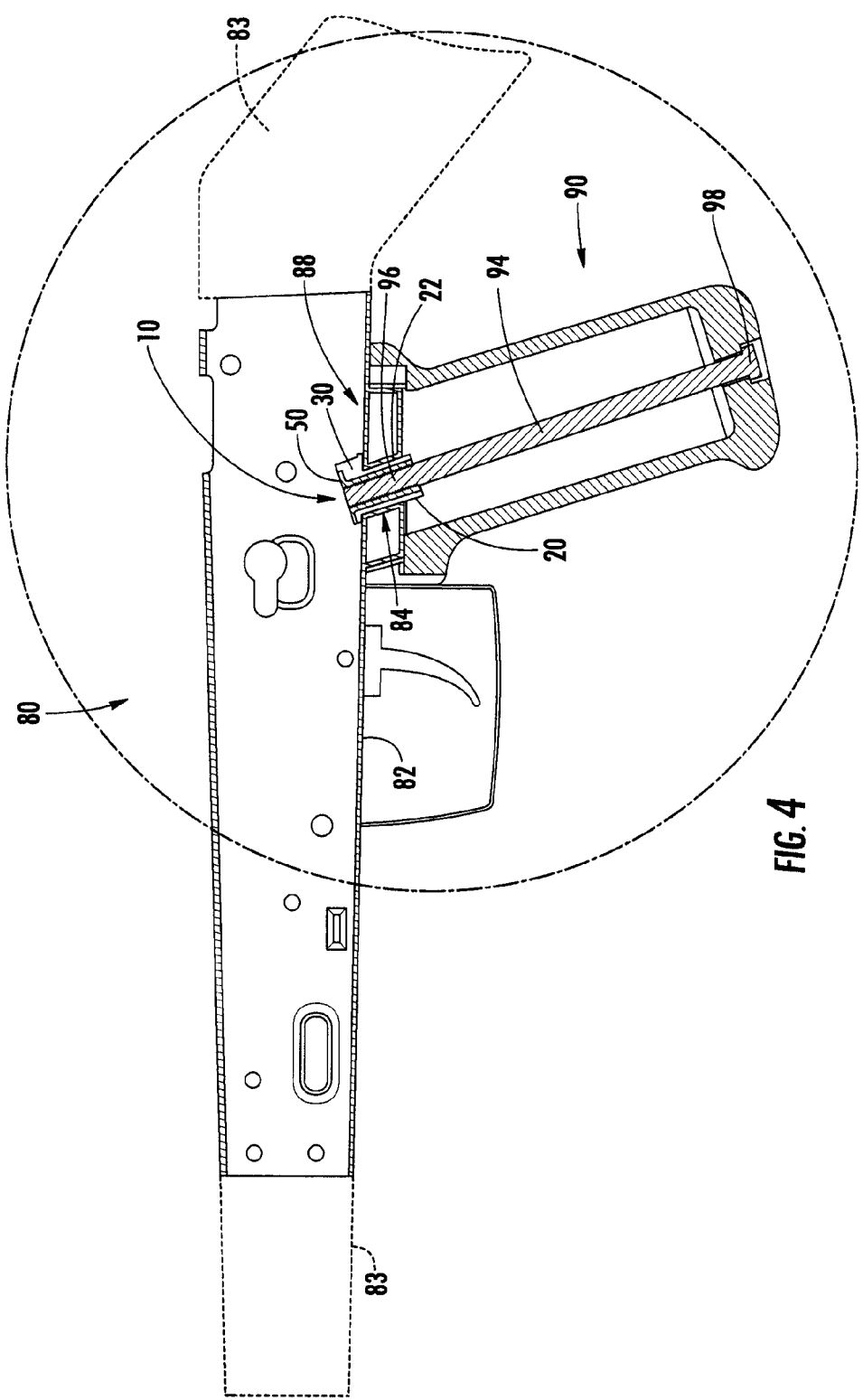
FIG. 4 is a cross-sectional side view of the assembled bushing of FIG. 1 in use with an elongate grip screw to secure a representative grip to an representative firearm.

FIG. 4 is a cross-sectional side view of the assembled bushing 10 of FIGS. 1 and 3B in use with an elongate grip screw 94 to secure a firearm grip 90 to its representative firearm 80. In the example embodiment of FIG. 4, the bushing is shown mounted to the receiver 82 of the firearm 80, although it will be understood by those skilled in the art that the same general steps for installation also can be used for installation of a grip or handle to a selected portion of the stock 83 of the firearm 80. During installation, the bushing 10 can first be positioned within the receiver 82 of the firearm, after which the elongate base 22 of the housing 20 can be inserted through an appropriately-sized aperture 84 at the bottom of the receiver. The aperture 84 is large enough for the elongate base 22 of the housing 20 to slide through, but is smaller than the outer profile of the seat 30 so that the entire bushing 10 does not pass through the aperture 84. For rearwardly-angled handles or grips 90, the bushing 10 can be inserted through the aperture 84 with the thick end 36 of the seat 30 (FIG. 2) toward the rear of the firearm, until the lower surface of the seat 30 contacts the inside bottom surface 88 of the receiver 82 and the bottom end of the elongate base 22 projects outside the receiver and at a rearwardly-oblique angle.

The firearm handle or grip 90 may then be positioned over the portion of the elongate base 22 that projects outside the receiver, and the grip screw 94 inserted through at least a portion of the grip 90 until the threaded end 96 of the grip screw 94 becomes aligned with the entrance opening 76 of the insert bore 70 (FIG. 3B). The grip screw 94 can then be rotated with the threaded end 96 of the grip screw 94 engaging with the interior thread 72 of the insert bore 70, until the head end 98 of the grip screw 94 bottoms against the grip 90 and the threaded end 96 of the grip screw 94 pulls or draws the insert 50 of the bushing 10 downward toward the grip 90. This acts to compress the semi-compliant seat 30 of the housing 20 against the inside bottom surface 88 of the receiver, thereby placing a tensile load on the grip screw 94 and securing the firearm handle 90 to the firearm 80.

In addition to the above advantages for maintaining the tensile load on the grip screw 94, the resilient, semi-compliant material forming the seat 30 and the elongate base 22 may also experience radial expansion during the axial compression of the housing 20, as the grip screw 94 draws the insert 50 toward the grip 90. This radial expansion can cause the outer surfaces of the housing 20 to expand around the inner surfaces of the aperture 84 to tightly clench the wall of the receiver 82 near the edges of the aperture 84, and to better couple the bushing 10 to the receiver 82 or stock 83. Thus, the semi-compliant material of the housing 20 may also allow the bushing 10 to form an improved, more-rigidly fixed anchor point for the grip 90 and grip screw 94.

In one aspect, the receiver 82 or stock 83 can also include an additional surface (not shown) which abuts the topside surface 62 of the retaining lip 60 and the raised edge 46 of the seat 30 when the bushing is inserted into the receiver 82, to prevent the insert 50 from inadvertently exiting the housing 20 before the threaded end 96 of the grip screw 94 can engage the interior thread 72 of the insert 50.

For repair or replacement, the grip screw 94 is removed from the bushing 10, the grip 90 is removed from the receiver 82 or stock 83 of the firearm, and the assembled bushing 10 can be extracted from within the receiver 82 or the stock 83. A user can then separate the insert 50 from the housing 20 to inspect each for damage or wear, and if needed, either the housing 20 and/or the insert 50 can be replaced. After replacement of either the insert 50 and/or the housing 20, the user inserts the original or a new insert 50 into the original or a new housing 20. Then, the user mounts the reassembled bushing 10 into the firearm receiver 82 or stock 83 and re-attaches the firearm grip 90 by inserting the grip screw 94 back through the grip 90 and secures it within the threaded insert bore of the insert 50.

Another embodiment of the present disclosure for a bushing 110 that is configured to receive an elongate grip screw and to serve as an anchor for securing a grip of a firearm to the receiver or the stock of the firearm is shown in FIGS. 5A-5C. As before, the bushing 110 includes an insert 150 having an elongate body 152 and a retaining lip 160, and which may be constructed of a highly-durable and hard metallic material. The insert 150 is removably received within a housing 120 having an elongate base 122 and a seat 130, and which may be constructed of a resilient, semi-compliant material. In this embodiment, however, the anti-rotation feature which prevents the insert 150 from rotating within the housing bore 140 is located proximate the interface between the outer surface 158 of the elongate body 122 and the interior surface 142 of the housing bore 140. For example, the anti-rotation feature of the bushing 110 can comprise a key 168 projecting radially from the outer surface 158 of the elongate body 122, and which is configured to slidably engage with a complimentary slot 148 formed into the interior surface 142 of the housing bore 140. Other non-circular structures formed into the elongate body 122 and the housing bore 140 which prevent the insert 150 from rotating within the housing bore 140 are also possible.

One benefit of the bushing 110 of FIGS. 5A-5C is that the seat 130 of the housing 120 does not include a raised edge and that the retaining lip 160 of the insert 150 completely covers the upper surface 132 of the seat 130 when the insert 150 and housing 120 are assembled together.

Additional alternative configurations for the housing and insert of the bushing are also possible, such as the housing bore having a narrow section proximate the bottom end of the elongate base for retaining the elongate body and preventing the insert from exiting the housing during use. These additional embodiments may also be considered to fall within the scope of the present disclosure.

The invention has been described in terms of preferred embodiments and methodologies considered by the inventors to represent the best mode of carrying out the invention. A wide variety of additions, deletions, and modification might well be made to the illustrated embodiments by skilled artisans without departing from the scope of the invention. In addition, it is possible to use some of the features of the embodiments described without the corresponding use of the other features. Accordingly, the foregoing description of the exemplary embodiments is provided for the purpose of illustrating the principle of the invention, and not in limitation thereof, since the scope of the invention is defined solely be the appended claims.

What is claimed:

1. A bushing for coupling a firearm grip to a receiver or stock of a firearm, the bushing comprising:
   a housing formed from a resilient material and including an elongate base, a seat extending radially outward from a top end of the base, the seat having an upper surface and a lower surface opposite the upper surface, the lower surface being configured to engage a surface of the receiver or stock of the firearm, and a housing bore extending from the upper surface of the seat to the bottom end of the base; and
   an insert formed from a material having a hardness greater than the resilient material of the housing, the insert sized and shaped for insertion within the housing bore, the insert including:
      an elongate body including an insert bore extending therealong and having an interior connection for engaging a fastener, and
      a retaining lip extending radially outwardly from a first end of the elongate body of the insert and having a bottom surface configured to engage the upper surface of the housing of the seat in a substantially flat-lying alignment;
   wherein the seat comprises a substantially wedge-shaped body defined by the upper surface of the seat being oriented substantially perpendicular to the base and the lower surface of the seat being oriented at an oblique angle to the upper surface;
   wherein the bushing includes an anti-rotation feature configured to prevent the insert from rotating within the housing bore when the fastener is received within the insert bore.

2. The bushing of claim 1, wherein the resilient material of the housing is selected from the group consisting of nylon and glass-filled nylon.

3. The bushing of claim 1, wherein the material of the insert is selected from the group consisting of carbon steel, stainless steel, and steel alloy.

4. The bushing of claim 1, wherein the anti-rotation feature is located at an interface between an outer surface of the elongate body of the insert and the housing bore.

5. The bushing of claim 4, wherein the housing bore is non-circular and the elongate body includes a non-circular cross section that is received within the non-circular housing bore without rotation.

6. The bushing of claim 1, wherein the anti-rotation feature is located at an interface between the upper surface of the seat and the retaining lip of the insert.

7. The bushing of claim 6, wherein the anti-rotation feature comprises at least one raised edge extending upward from the upper surface of the seat to contact a lateral side edge of the retaining lip.

8. The bushing of claim 7, wherein a top surface of the retaining lip and a top surface of the raised edge are substantially flush with one another when the insert is installed into the housing.

9. The bushing of claim 1, wherein the wedge-shaped body of the seat is configured to orientate the firearm handle at an oblique angle to a longitudinal axis of the firearm aligned with a gun bore of the firearm.

10. The bushing of claim 1, further comprising a curved chamfer surface between the upper surface of the seat and an internal surface of the housing bore.

11. The bushing of claim 10, further comprising a fillet radius between the bottom surface of the retaining lip and the outer surface of the elongate body, the fillet radius being receivable within the curved chamfer surface when the insert is installed within the housing.

* * * * *